Oct. 30, 1934.    W. J. PEARMAIN ET AL    1,978,687
CLUTCH
Filed April 6, 1931    3 Sheets-Sheet 1

Inventors:
William J. Pearmain
and Lester E. Hodges
by Rector, Hibben, Davis & Macauley
Attys

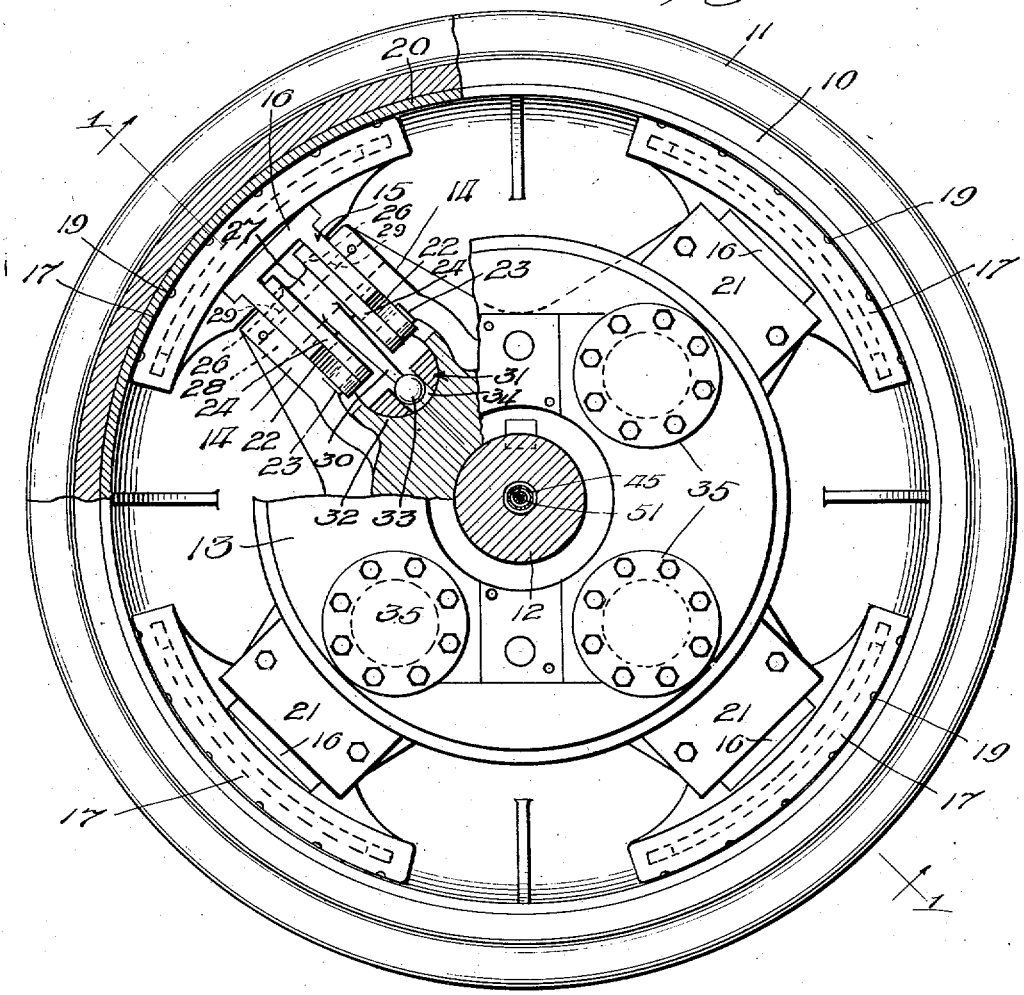

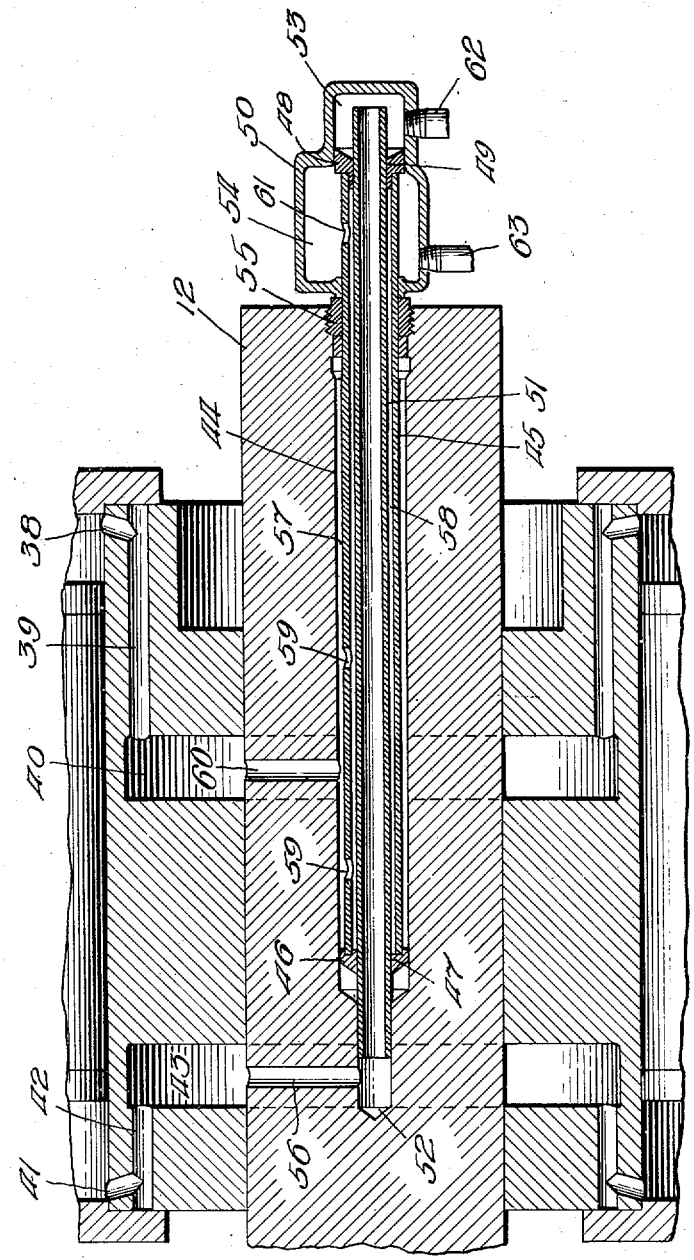

Patented Oct. 30, 1934

1,978,687

UNITED STATES PATENT OFFICE 1,978,687

CLUTCH

William J. Pearmain, Racine, Wis., and Lester E. Hodges, Houston, Tex., assignors of one-half to The Twin Disc Clutch Company, Racine, Wis., a corporation of Wisconsin, and one-half to Portable Rig Company, Inc., Houston, Tex., a corporation of Texas Application April 6, 1931, Serial No. 527,961

19 Claims. (Cl. 192—86)

Our invention relates to clutches of the friction type and is concerned with devices of this nature in which the clutch is engaged and disengaged entirely by a suitable fluid pressure, whether gaseous or liquid.

One object of our invention is to provide a clutch of the character indicated in which the engaging pressure is exerted radially by a plurality of shoes located circumferentially of the clutch proper and arranged to automatically position themselves so as to compensate for differences in wear, thereby achieving substantially the same degree of grip for the several shoes.

A further object is to devise a fluid operated clutch wherein the engaging pressure of the gripping part is a function solely of the working pressure built up in the fluid line and is entirely independent of any centrifugal effect due to rotation of the clutch parts.

A further object is the incorporation with a fluid operated clutch of a simple arrangement for translating the working pressure of the fluid into a mechanical force applied to the clutch shoes and preferably comprising an eccentric or generally a crank construction.

A further object is to provide a clutch of the character described in which the design is such as to facilitate assembly and movement of the clutch shoes for change or replacement of friction material.

These and further objects of our invention will be set forth in the following specification, reference being had to the accompanying drawings, and the novel means by which said objects are effectuated will be definitely pointed out in the claims.

In the drawings:

Fig. 2 is an end view of the clutch, as viewed in the direction of the arrow 2 in Fig. 1, a portion being shown in section.

Fig. 4 is an enlarged section of the clutch hub and its accompanying shaft, showing the arrangement for admitting and exhausting fluid pressure to and from the actuating mechanism for the clutch shoes.

Figure 1:
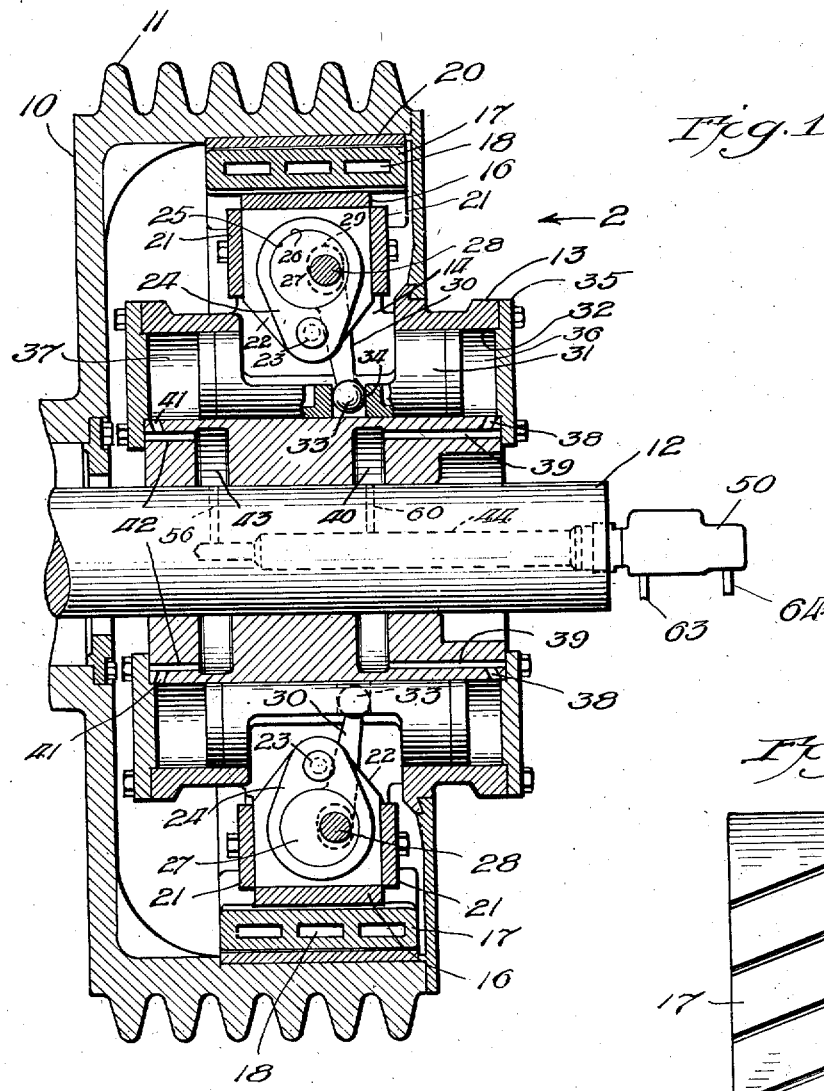
Figure 1 is a sectional view of our improved clutch, taken generally along the line 1—1 in Fig. 2, and looking in the direction of the arrows.
Figure 3:
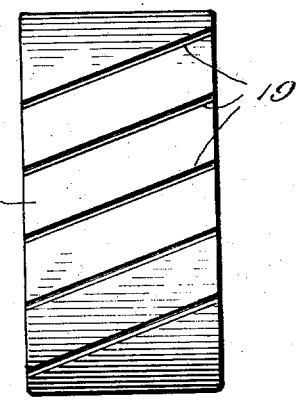
Fig. 3 is a plan view of one of the clutch shoes showing the engaging surface thereof.

Referring to Figs. 1 and 2, the numeral 10 designates a member which constitutes one of the rotary parts to be connected by the clutch. The shaft 12, axially aligned with the member 10, forms the other rotary part to be connected by the clutch and has keyed, or otherwise secured thereon, a hub 13. Extending radially from said hub is a plurality of pairs of guides 14, the number of pairs being dependent upon the number of clutch shoes employed and in Fig. 2, there are four such pairs shown. Slidably mounted within each pair of guides 14, 14 is a U-shaped connector 15 whose base 16 is dovetailed into a clutch shoe 17, which is preferably provided with cooling passages 18, extending end to end of the shoe. The working face of each shoe 17 may be provided with a plurality of grooves 19 (see Fig. 3), and all of said shoes engage with a friction lining 20 which is recessed in the inner, annular face of the member 10, although it will be understood that such friction material may be mounted directly on the several working faces of the clutch shoes.

In order to retain each connector 16 within its accompanying guides 14 and to insure its movement in a true radial direction, end plates 21 are secured to the opposite sides of each pair of guides 14, so that each connector is substantially enclosed within a box-like formation. The end plates 21 are further carried outwardly sufficiently to insure that the shoe 17 will likewise be restricted to movements only in a radial direction.

The limbs 22 of each connector extend inwardly toward the shaft 12 and at their inner ends receive pins 23, of which there is one for each limb. The inner ends of said pins have pivotally mounted thereon links 24, each of which lies closely along the inner surface of the adjacent limb 22 and which are directed outwardly from the shaft 12 toward the base 16 of the connector 15. Each link 24 is provided with a hole 25 which are axially aligned with each other and symmetrically disposed with reference to a radial, median line passing between the limbs 22 of the connector 15. Rockably mounted within the holes 25, 25 are the annular shoulders 26 of an eccentric 27 which is in turn mounted to rock about a pin 28 which is offset from the aforesaid median line and extends through the limbs 22 and has its ends fixed in the guides 14, 14. Passageway of the pin 28 through the limbs 22 is permitted by elongated openings 29, so that the connector may move radially as hereinafter described.

An arm 30 is fixedly connected to the eccentric 27 and extends inwardly toward the shaft 12 for engagement with a double acting piston 31 which is mounted to reciprocate in a cylinder 32 provided in the hub 13 adjacent each pair of guideways 14. The inner end of the arm 30 is ballshaped as at 33 and said ball is received within a slot 34 formed in said piston. Movements of the piston 31 will accordingly effect a movement of the arm 30 and consequently will result in radial movement of the shoe 17 through the eccentric connection.

The ends of each cylinder 32 are closed by plates 35 which define with the right end of the piston 31, as viewed in Fig. 1, a working chamber 36 and with the left end of said piston, a working chamber 37. The chamber 36 communicates by way of a port 38 and a passage 39 with an annular chamber 40 which is provided in the hub 13 and which encircles and opens toward the shaft 12. Similarly, the chamber 37 communicates by way of a port 41 and a passage 42 with an annular chamber 43 which is similar to and axially spaced from the chamber 40.

As stated above, there is a piston 31 and a cylinder 32 for each shoe actuating mechanism, and the purpose of the annular chambers 40 and 43 is to provide chambers which are common to the indicated ends of the several cylinders. In order to deliver fluid pressure to the several cylinders, the shaft 12 is axially bored from one end to provide a passageway 44 (see Fig. 4), within which is mounted a tube 45 which is spaced from the wall of the passage 44 and whose inner end rests on a plug 46 having a central opening 47. The outer end of the tube 45 rests upon a similar plug 48 which also is provided with a central opening 49 and which is supported in a housing 50 that is held against rotation with the shaft 12 and its accompanying tube. Nested within the tube 45 is a second tube 51 which is concentric with the tube 45 and spaced therefrom. The inner end of the tube 51 extends beyond the plug 46 through the opening 47 and is carried in a passage 52 having a smaller diameter than the passage 44. The opposite end of the tube 51 passes through the opening 49 in the plug 48 for communication with a chamber 53 which is provided in the housing 50 and which is constituted by the plug 48 which acts as a septum to form the indicated chamber and also a chamber 54. The plug 46 closes off the inner end of the passage 44 and another plug 55 which is threaded in the outer end of the shaft 12 and which closely engages the tube 45 performs a similar function for the outer end of said passage.

The tube 51 forms a direct connection between the chamber 53 and the annular chamber 43 by way of a radial passage 56 which connects the passage 52 with the chamber 43. The disposition of the tubes 51 and 45 with reference to each other and to the passage 44 creates an outer, annular passage 57 and an inner, annular passage 58. Within the shaft 12, said annular passages communicate by way of ports 59 and the annular passage 57 communicates with the annular chamber 40 by way of a radial passage 60, provided in the shaft 12. The chamber 54 communicates with the inner, annular passage 58 by way of a port 61. By this arrangement, it is possible, therefore, to admit and exhaust fluid pressure to and from the working chambers in the several cylinders and so control the position of the clutch shoes.

In order to accomplish this result, a pipe 62 connects the chamber 53 with a suitable source of fluid pressure through some common form of reversing valve (not shown), and a similar pipe 63 connects the chamber 54 with said fluid pressure source also by way of said reversing valve. As valves of this type are common in the art the same has not been particularly illustrated or described, but it will be understood that it will be of the form in which when pressure is being admitted through the pipe 62, for example, the position of the valve will be such as to permit exhausting of pressure through the pipe 63, and vice versa.

Fig. 1 of the drawings shows the position of the shoes when occupying a retracted, or disengaged, position. However, when the reversing valve is manipulated to admit pressure to the right ends of the cylinders 32, as viewed in Fig. 1, and to permit the exhausting of pressure that might otherwise be built up in the left end of said cylinders, the several pistons 31 will move toward the left to thereby rotate the several eccentrics about the pins 28 and accordingly move the clutch shoes outwardly for engagement with the inner surface of the member 10. When it is desired to disengage the clutch, an opposite movement of the reversing valve will accomplish a reversal of the above action, namely, a moving of the several pistons toward the right and a withdrawal of the clutch shoes from engaging position with the member 10.

The clutch is, therefore, under easy control at all times and its operation may be effected merely by manual control of a simple valve. It will be particularly noted that the application of the actuating force to the clutch shoes is so arranged that centrifugal forces operating during the rotation of the clutch when disengaged do not tend to create any dragging condition of the shoes against the hub and this condition will obtain even though there is no fluid pressure operating at all. The dovetail connection between each clutch shoe and the accompanying connector enables the former to be easily removed simply by detaching the plates 21 for insertion of a new shoe, or the replacement of friction material in the event that the latter is carried by the individual shoes.

While we have shown one set of elements and combinations thereof for effectuating our improved clutch construction, it will be understood that the same is intended for purpose of illustration only and in no wise to restrict our device to the exact forms and structures shown, for many changes may be made therein without departing from the spirit of our invention.

We claim:

1. In a clutch, the combination of a member and a plurality of radially movable shoes attachable to separate rotary parts and adapted for driving engagement with each other, a plurality of cylinders on the rotary part which supports said shoes, the axes of said cylinders being substantially parallel to the axis of the clutch, double acting pistons reciprocable in said cylinders and each connected to a companion shoe, and means for delivering fluid to said cylinders at one end of said pistons for moving said shoes to a gripping position and at the opposite end for retracting said shoes.

2. In a clutch, the combination of a member attachable to one rotary part, a plurality of movable shoes attachable to a second rotary part, a plurality of cylinders carried by said second part, a double acting piston reciprocable in each of said cylinders, means comprising substantially a crank connection operatively uniting each of said shoes with a companion piston, and means for delivering fluid to the opposite sides of said pistons for respectively moving said shoes into working position and for retracting the same.

3. In a clutch, the combination of a member attachable to one rotary part, a plurality of movable shoes attachable to a second rotary part, a plurality of cylinders carried by said second part, a double acting piston reciprocable in each of said cylinders, means comprising an eccentric disc rockably mounted on each of said shoes and connected with a companion piston, and means for delivering fluid to said cylinders for actuating said shoes to a gripping position and for retracting the same.

4. In a clutch, the combination of a member attachable to one rotary part, a plurality of movable shoes attachable to a second rotary part, a plurality of cylinders circumferentially disposed around the axis of said second part with the axes of said cylinders substantially parallel to said axis and carried by said second part, a piston reciprocable in each of said cylinders, means comprising an eccentric disc rockably mounted on each of said shoes and connected with a companion piston, and means for delivering fluid to said cylinders for actuating said shoes to a gripping position.

5. In a clutch, the combination of a member attachable to one rotary part, a plurality of movable shoes attachable to a second rotary part, a plurality of cylinders carried by said second part, double acting pistons reciprocable in each of said cylinders, means comprising substantially a crank connection operatively uniting each of said shoes with a companion piston, and means for delivering fluid to said cylinders on one end of said pistons for moving said shoes to a gripping position and on the opposite ends for retracting said shoes.

6. In a clutch, the combination of a member attachable to one rotary part, a shaft constituting a second rotary part, a plurality of movable shoes attachable to said shaft, a plurality of cylinders carried by said shaft, a piston reciprocable in each of said cylinders, means comprising substantially a crank connection operatively uniting each of said shoes with a companion piston, and means located axially of said shaft and communicating with said cylinders for delivering fluid on the opposite ends of said pistons for respectively moving said shoes into working position and for retracting the same.

7. In a clutch, the combination of a member attachable to one rotary part, a shaft constituting a second rotary part, a plurality of movable shoes attachable to said shaft, a plurality of cylinders carried by said shaft, double acting pistons reciprocable in said cylinders, means comprising substantially a crank connection operatively uniting each of said shoes with a companion piston, and means located axially of said shaft and communicating with said cylinders for delivering fluid on one end of said pistons for moving said shoes to a gripping position and on the opposite ends for retracting said shoes.

8. In a clutch, the combination of a member attachable to one rotary part, a shaft constituting a second rotary part, a plurality of movable shoes attachable to said shaft, a plurality of cylinders carried by said shaft, a double acting piston reciprocable in each of said cylinders, means comprising substantially a crank connection operatively uniting each of said shoes with a companion piston, and means located axially of said shaft and communicating with said cylinders comprising concentric, spaced tubes mounted in said shaft, the outer ends of each tube being separately connectible to a source of fluid pressure.

9. In a clutch, the combination of a member and a plurality of movable shoes attachable to separate rotary parts and adapted for driving engagement with each other, a plurality of cylinders, the axes of said cylinders being substantially parallel to the axis of the clutch, a double acting piston reciprocable in each of said cylinders and each connected to a companion shoe, and means for delivering fluid to said cylinders on one end of said pistons for moving said shoes to a gripping position and on the opposite ends for retracting said shoes.

10. In a clutch, the combination of a member attachable to one rotary part, a plurality of movable shoes attachable to a second rotary part, a plurality of cylinders circumferentially disposed around the axis of said second part with the axes of said cylinders substantially parallel to said axis, a piston reciprocable in each of said cylinders, means comprising an eccentric disc rockably mounted on each of said shoes and connected with a companion piston, and means for delivering fluid to said cylinders for actuating said shoes to a gripping position.

11. In a clutch, the combination of a member attachable to one rotary part, a plurality of movable shoes attachable to a second rotary part, a plurality of cylinders, double acting pistons reciprocable in said cylinders, means comprising substantially a crank connection operatively uniting each of said shoes with a companion piston, and means for delivering fluid to said cylinders on one end of said pistons for moving said shoes to a gripping position and on the opposite ends for retracting said shoes.

12. In a clutch, the combination of a member attachable to one rotary part, a shaft constituting a second rotary part, a plurality of movable shoes attachable to said shaft, a plurality of cylinders, double acting pistons reciprocable in said cylinders, means comprising substantially a crank connection operatively uniting each of said shoes with a companion piston, and means located axially of said shaft and communicating with said cylinders for delivering fluid on one end of said pistons for moving said shoes to a gripping position and on the opposite ends for retracting said shoes.

13. In a clutch, the combination of a member attachable to one rotary part, a shaft constituting a second rotary part, a plurality of movable shoes attachable to said shaft, a plurality of cylinders, double acting pistons reciprocable in said cylinders, means comprising substantially a crank connection operatively uniting each of said shoes with a companion piston, and means located axially of said shaft and communicating with said cylinders comprising concentric, spaced tubes mounted in said shaft, the outer ends of each tube being separately connectible to a source of fluid pressure.

14. In a clutch, the combination of a member attachable to one rotary part, a shaft constituting a second rotary part, a plurality of movable shoes attachable to said shaft, a plurality of cylinders, double acting pistons reciprocable in said cylinders, means operatively connecting each of said shoes with a companion piston, and means located axially of said shaft and communicating with said cylinders comprising concentric, spaced tubes mounted in said shaft, the outer ends of each tube being separately connectible to a source of fluid pressure.

15. In a clutch, the combination of a member attachable to one rotary part, a shaft constituting a second rotary part, a movable shoe attachable to said shaft, a cylinder, a double acting piston reciprocable in said cylinder, means comprising substantially a crank connection operatively connecting said shoe with said piston, and means located axially of said shaft and communicating with said cylinder comprising concentric, spaced tubes mounted in said shaft, the outer ends of each tube being separately connectible to a source of fluid pressure.

16. In a clutch, the combination of a member and a plurality of shoes attachable to separate rotary parts and adapted for driving engagement with each other, said shoes being slidably mounted for movement inwardly and outwardly of the clutch on their associated rotary part, a plurality of cylinders, the axes of said cylinders being substantially parallel to the axis of the clutch, a double acting piston reciprocable in each of said cylinders and each connected to a companion shoe, and means for delivering fluid to said cylinders on one end of said pistons for moving said shoes to a gripping position and on the opposite end for retracting said shoes.

17. In a clutch, the combination of a member and a plurality of shoes attachable to separate rotary parts and adapted for driving engagement with each other, said shoes being slidably mounted for movement inwardly and outwardly of the clutch on their associated rotary part, a plurality of cylinders on the rotary part which supports said shoes, the axes of said cylinders being substantially parallel to the axis of the clutch, a double acting piston reciprocable in each of said cylinders and each connected to a companion shoe, and means for delivering fluid to said cylinders on one end of said pistons for moving said shoes to a gripping position and on the opposite end for retracting said shoes.

18. In a clutch, the combination of a member and a plurality of shoes attachable to separate rotary parts and adapted for driving engagement with each other, said shoes being slidably mounted for movement radially of the clutch on their associated rotary part, a plurality of cylinders on the rotary part which supports said shoes, the axes of said cylinders being substantially parallel to the clutch, a double acting piston reciprocable in each of said cylinders and each connected to a companion shoe substantially at the mid-portion thereof, and means for delivering fluid to said cylinders on one end of said pistons for moving said shoes to a gripping position and on the opposite end for retracting said shoes.

19. In a clutch, the combination of a member and a plurality of shoes attachable to separate rotary parts and adapted for driving engagement with each other, said shoes being slidably mounted for movement inwardly and outwardly of the clutch on their associated rotary part, a plurality of cylinders, a double acting piston reciprocable in each of said cylinders, means comprising substantially a crank connection operatively uniting each of said shoes with a companion piston, and means for delivering fluid to said cylinders on one end of said pistons for moving said shoes to a gripping position and on the opposite end for retracting said shoes.

WILLIAM J. PEARMAIN.
LESTER E. HODGES.

CERTIFICATE OF CORRECTION.

Patent No. 1,978,687.    October 30, 1934.

WILLIAM J. PEARMAIN, ET AL.

It is hereby certified that error appears in the printed specification of the above numbered patent requiring correction as follows: Page 2, line 128, claim 1, strike out the word "radially"; page 4, line 89, claim 18, after "the" insert the words axis of the; and that the said Letters Patent should be read with these corrections therein that the same may conform to the record of the case in the Patent Office.

Signed and sealed this 5th day of February, A. D. 1935.

Leslie Frazer (Seal)    Acting Commissioner of Patents.

15. In a clutch, the combination of a member attachable to one rotary part, a shaft constituting a second rotary part, a movable shoe attachable to said shaft, a cylinder, a double acting piston reciprocable in said cylinder, means comprising substantially a crank connection operatively connecting said shoe with said piston, and means located axially of said shaft and communicating with said cylinder comprising concentric, spaced tubes mounted in said shaft, the outer ends of each tube being separately connectible to a source of fluid pressure.

16. In a clutch, the combination of a member and a plurality of shoes attachable to separate rotary parts and adapted for driving engagement with each other, said shoes being slidably mounted for movement inwardly and outwardly of the clutch on their associated rotary part, a plurality of cylinders, the axes of said cylinders being substantially parallel to the axis of the clutch, a double acting piston reciprocable in each of said cylinders and each connected to a companion shoe, and means for delivering fluid to said cylinders on one end of said pistons for moving said shoes to a gripping position and on the opposite end for retracting said shoes.

17. In a clutch, the combination of a member and a plurality of shoes attachable to separate rotary parts and adapted for driving engagement with each other, said shoes being slidably mounted for movement inwardly and outwardly of the clutch on their associated rotary part, a plurality of cylinders on the rotary part which supports said shoes, the axes of said cylinders being substantially parallel to the axis of the clutch, a double acting piston reciprocable in each of said cylinders and each connected to a companion shoe, and means for delivering fluid to said cylinders on one end of said pistons for moving said shoes to a gripping position and on the opposite end for retracting said shoes.

18. In a clutch, the combination of a member and a plurality of shoes attachable to separate rotary parts and adapted for driving engagement with each other, said shoes being slidably mounted for movement radially of the clutch on their associated rotary part, a plurality of cylinders on the rotary part which supports said shoes, the axes of said cylinders being substantially parallel to the clutch, a double acting piston reciprocable in each of said cylinders and each connected to a companion shoe substantially at the mid-portion thereof, and means for delivering fluid to said cylinders on one end of said pistons for moving said shoes to a gripping position and on the opposite end for retracting said shoes.

19. In a clutch, the combination of a member and a plurality of shoes attachable to separate rotary parts and adapted for driving engagement with each other, said shoes being slidably mounted for movement inwardly and outwardly of the clutch on their associated rotary part, a plurality of cylinders, a double acting piston reciprocable in each of said cylinders, means comprising substantially a crank connection operatively uniting each of said shoes with a companion piston, and means for delivering fluid to said cylinders on one end of said pistons for moving said shoes to a gripping position and on the opposite end for retracting said shoes.

WILLIAM J. PEARMAIN.
LESTER E. HODGES.

CERTIFICATE OF CORRECTION.

Patent No. 1,978,687.  October 30, 1934.

WILLIAM J. PEARMAIN, ET AL.

It is hereby certified that error appears in the printed specification of the above numbered patent requiring correction as follows: Page 2, line 128, claim 1, strike out the word "radially"; page 4, line 89, claim 18, after "the" insert the words axis of the; and that the said Letters Patent should be read with these corrections therein that the same may conform to the record of the case in the Patent Office.

Signed and sealed this 5th day of February, A. D. 1935.

Leslie Frazer (Seal) Acting Commissioner of Patents.